United States Patent
Böttcher (10) Patent No.: US 10,215,922 B2
(45) Date of Patent: Feb. 26, 2019

(54) OPTICAL FIBER CLEAVING DEVICE

(71) Applicant: Nyfors Teknologi AB, Stockholm (SE)

(72) Inventor: Uwe Böttcher, Stockholm (SE)

(73) Assignee: Nyfors Teknologi AB, Stockholm (SE)

( * ) Notice: Subject to any disclaimer, the term of this patent is extended or adjusted under 35 U.S.C. 154(b) by 217 days.

(21) Appl. No.: 15/115,829

(22) PCT Filed: Feb. 3, 2015

(86) PCT No.: PCT/SE2015/050114
§ 371 (c)(1),
(2) Date: Aug. 1, 2016

(87) PCT Pub. No.: WO2015/115996
PCT Pub. Date: Aug. 6, 2015

(65) Prior Publication Data
US 2017/0168240 A1    Jun. 15, 2017

(30) Foreign Application Priority Data
Feb. 3, 2014   (EP) ..................... 14153711

(51) Int. Cl.
*G02B 6/25* (2006.01)
*G02B 6/255* (2006.01)
*G02B 6/245* (2006.01)

(52) U.S. Cl.
CPC ............... *G02B 6/25* (2013.01); *G02B 6/245* (2013.01); *G02B 6/2551* (2013.01); *G02B 6/2553* (2013.01)

(58) Field of Classification Search
CPC .................................. G02B 6/25; G02B 6/245
USPC .................................................. 385/134–137
See application file for complete search history.

(56) References Cited

U.S. PATENT DOCUMENTS

| | | | | |
|---|---|---|---|---|
| 4,473,942 A * | 10/1984 | Ridgway | .................. | G02B 6/25 225/101 |
| 4,474,319 A * | 10/1984 | Walker | .................... | B26F 3/002 225/101 |
| 4,557,049 A * | 12/1985 | Cribbs | ..................... | G02B 6/25 225/96 |
| 4,852,244 A * | 8/1989 | Lukas | .................... | G02B 6/245 225/96.5 |
| 7,669,744 B2 * | 3/2010 | Yazaki | ..................... | G02B 6/25 225/1 |
| 2005/0226586 A1* | 10/2005 | Watte | ....................... | G02B 6/25 385/134 |

(Continued)

FOREIGN PATENT DOCUMENTS

EP   1 306 700 A2   5/2003
EP   2 375 269 A2   10/2011
(Continued)

*Primary Examiner* — Ryan Lepisto
*Assistant Examiner* — Guy Anderson
(74) *Attorney, Agent, or Firm* — Dilworth & Barrese, LLP (57) ABSTRACT

An optical fiber cleaving device comprises a frame provided with cleaving means for cleaving an optical fiber (4) therewith, and first and second (6) fiber clamping arrangements configured to hold a fiber (4) to be cleaved on opposite sides of the fiber cleaving means during cleaving of the fiber (4). The optical fiber cleaving device further comprises first securing means configured to re-movably secure said first clamping arrangement to the frame and second securing means configured to removably secure said second clamping arrangement (6) to the frame.

13 Claims, 5 Drawing Sheets

(56) References Cited

U.S. PATENT DOCUMENTS

| | | | |
|---|---|---|---|
| 2006/0201982 A1* | 9/2006 | Yazaki | G02B 6/25 |
| | | | 225/1 |
| 2006/0263028 A1 | 11/2006 | Honma | |
| 2010/0023921 A1 | 1/2010 | Chaar et al. | |
| 2010/0270350 A1* | 10/2010 | Bylander | B26F 3/002 |
| | | | 225/2 |
| 2011/0052135 A1* | 3/2011 | Wiley | G02B 6/25 |
| | | | 385/137 |
| 2011/0176780 A1 | 7/2011 | Barnes et al. | |
| 2012/0018482 A1* | 1/2012 | Pepin | G02B 6/25 |
| | | | 225/2 |
| 2012/0141082 A1* | 6/2012 | Sawicki | G02B 6/25 |
| | | | 385/134 |

FOREIGN PATENT DOCUMENTS

| | | |
|---|---|---|
| JP | H11-326646 A | 11/1999 |
| JP | 2012-73374 A | 4/2012 |
| KR | 10-829542 B1 | 5/2008 |
| WO | 2010/120570 A2 | 10/2010 |
| WO | 2011/25929 A2 | 3/2011 |
| WO | 2011/119682 A1 | 9/2011 |

* cited by examiner

OPTICAL FIBER CLEAVING DEVICE

TECHNICAL FIELD OF THE INVENTION

The present invention relates to an optical fiber cleaving device comprising a frame provided with cleaving means for cleaving an optical fiber therewith, first and second fiber clamping arrangements configured to hold a fiber to be cleaved on opposite sides of the fiber cleaving means during cleaving of the fiber, and first securing means configured to removably secure said first clamping arrangement to the frame.

The invention relates to such an optical fiber cleaving device of any conceivable type, which can be used for professional mass-production purposes in the fiber-optic communication industry or in more specialized fields such as in manufacturing of sensors or fiber-lasers or even for small scale manufacturing in workshops, as a few examples.

Optical fiber ends are commonly prepared for a variety of purposes (jointing, characterization etc) by a process known as cleaving. In such a process, a blade prepared from a hard material, such as diamond, is brought into a lateral engagement with the fiber to be cleaved in such a manner as to initiate a fracture which subsequently propagates through the fiber cross-section until the fiber parts. The resulting cleaved fiber end surface should, as far as possible, be optically flat and perpendicular or angled to the fiber longitudinal axis. To obtain such fiber ends it is among other things important that the fiber to be cleaved is secured in a position suitable for cleaving. As the cleaving of the fiber often is one step of many in an industrial process, the fiber should however also be easy inserted and removed from the cleaving device for easily being brought to other process steps, such as welding.

The optical fiber industry is growing and therewith the uses of optical fibers. A fiber cleaved in an optical fiber cleaving device can therefore be subsequently subjected to many different process steps.

BACKGROUND ART

An optical fiber cleaving device of the type described in the introduction is known through, for example, the document US 2006/0263028 A1.

The cleaving device described in said document is a handheld fiber cleaving device, but has features and functions comparable to such a device commonly used in industrial processes.

In such a commonly used optical fiber cleaving device a holder (often called clamp) can be removed from the cleaving device main body for insertion of a fiber to be cleaved in said holder. The fiber is clamped by the holder and the holder is secured to the said main body. The cleaving device main body also comprises cleaving means such as a diamond blade and a securing arrangement for securing the fiber to be cleaved on an opposite side of the cleaving means with respect to said holder. The fiber is accordingly held by the holder and the securing arrangement and cleaved by the cleaving means therebetween.

After cleaving, the holder with the fiber to be used is removed from the cleaving device and brought to a machine in the next process step, such as an optical fiber welding machine. The part of the fiber left in the cleaving device can be automatically brought to some type of litter container or manually removed from the cleaving device in two steps. Firstly, an operator has to release said securing arrangement and secondly, remove the fiber part from the cleaving device using a tweezer or the like.

In some industrial processes the fiber part often thrown away is used for testing or for manufacturing of sensors. This part of the cleaved fiber is then moved from the cleaving device with the method described and brought to another machine for securing and further processing. One problem of known optical fiber cleaving devices is the step of removing said fiber part from the cleaving device with the tweezer. The fibers used have often a diameter below 1 mm and are therefore problematic to grip and place in another machine by means of a tweezer.

SUMMARY OF THE INVENTION

The object of the present invention is to provide an optical fiber cleaving device of the type defined in the introduction being improved in at least some aspect with respect to such cleaving devices already known, for example through said document.

This object is according to the invention obtained by providing an optical fiber cleaving device according to the description herein . Said second securing means configured to removably secure said second clamping arrangement allows said second clamping arrangement to be removed from the cleaving device after cleaving of a fiber for insertion of said clamping arrangement and therewith a part of the fiber cleaved in another machine for further processing. This operation can accordingly be performed without the fiber part being released from the second clamping arrangement and without use of additional tools, such as a tweezer.

According to an embodiment of the invention said second clamping arrangement has two members provided with plane surfaces facing each other, at least part of said members being movable with respect to each other between at least a first closed clamping position enabling securing of a fiber therebetween and a second open position allowing a fiber to be inserted in or removed from the second clamping arrangement.

According to another embodiment of the invention when the second clamping arrangement is secured to the frame at least part of a first of said two members is fixedly arranged relative to the frame and at least part of a second of said two members is movably arranged relative to the frame and to said first member. By having at least part of one of said two members fixedly arranged relative to the frame and at least part of a second of said two members movably arranged relative to the frame and to said first member when the second clamping arrangement is secured to the frame provides a second clamping arrangement which is possible to stably secure to said frame and at the same time is obtained suitable for the handling of a fiber.

According to another embodiment of the invention said second clamping arrangement is provided with power means configured to urge at least said parts of said members towards said closed clamping position. Said power means enable easy and reliable securing of a fiber in said second clamping arrangement.

According to another embodiment of the invention said second clamping arrangement is provided with locking means configured to maintain at least said parts of said members in said closed clamping position. Said locking means enable easy maintaining of at least said parts of said members in said closed clamping position once reached and the fiber to be cleaved is maintained in a suitable position during cleaving, without the risk of slipping away.

According to another embodiment of the invention one of said members has an element provided with said plane surface of that member and movably arranged with respect to a body of that member so as to in said closed clamping position assume a position in which the plane surface thereof extend in parallel with the plane surface of the other said member.

Said element provided with said plane surface being movable with respect to said body allows smooth insertion of a fiber between said two plane surfaces and enables securing of said fiber in said second clamping arrangement with precision and with minimal risk of damage of the fiber as said plane surface of said movable element will be automatically aligned with the extension of said fiber regardless of the diameter thereof.

According to another embodiment of the invention said element is rotatably arranged with respect to a body of that member about an axis in parallel with said plane surface and perpendicular to a determined direction, said members being configured to hold a fiber extending in said determined direction in said closed position of said second clamping arrangement.

According to another embodiment of the invention one of said plane surfaces is provided with a groove configured for receiving at least part of a fiber to be cleaved in said closed clamping position. Said groove provides improved support of said fiber to be cleaved in said closed clamping position and thereby reduces the risk of movement of the fiber during cleaving with the risk of unwanted damage on the fiber ends as a result.

According to another embodiment of the invention said plane surface provided with said groove is a plane surface facing said plane surface on said element. One of said plane surfaces being provided with said groove and said element provided with the other plane surface and arranged rotatably about said axis provides a possibility to efficiently secure and hold a fiber to be cleaved in said closed clamping position without the risk of movement of the fiber during cleaving.

According to another embodiment of the invention said groove is tapering in the direction away from said plane surface provided with the groove, said groove being preferably U-shaped or V-shaped. Said groove tapering in the direction away from said plane surface provided with the groove provides a possibility for fibers with different diameters to be received in said groove. A U-shaped or V-shaped groove is an especially preferred groove for receiving fibers with different diameters without the risk of damaging said fibers.

According to another embodiment of the invention each of said two members is provided with a slope configured in such a way that the two slopes together define an opening tapering in the direction of insertion of a fiber in the second clamping arrangement. Said two members being provided with a slope provides uncomplicated insertion of a fiber in said second clamping arrangement.

According to another embodiment of the invention said two members are elongated members extending parallel or at least substantially parallel to each other in said closed clamping position, and said two members are interconnected through a hinge portion in such a way that when two ends of said two members facing each other are moved towards each other the opposite two ends are separated, and reverse. This configuration of two elongated members and interconnection thereof is suitable for enabling uncomplicated manual handling of the second clamping arrangement and thereby a fiber part securable therein.

According to another embodiment of the invention said second clamping arrangement is provided with guiding means configured to guide a fiber to be cleaved towards a suitable securing position when the fiber is inserted in the second clamping arrangement. Said guiding means enable smooth insertion of a fiber towards a suitable position in the second clamping arrangement and as no additional tools or operator hands have to be used for guiding said fiber during insertion thereof, the fiber is easily kept clean from oil, dust and the like.

According to another embodiment of the invention said second clamping arrangement is provided with third securing means configured to removably secure said guiding means to a body of said second clamping arrangement. Said third securing means configured to removably secure said guiding means to a body of said second clamping arrangement makes it possible for an operator to fast and easily provide said second clamping arrangement with guiding means suitable for a specific diameter of fibers.

According to another embodiment of the invention said second member is provided with said guiding means. Said second member being provided with said guiding means improves the ability of said guiding means to guide a fiber to be cleaved towards a suitable securing position when the fiber is inserted in the second clamping arrangement.

According to another embodiment of the invention said optical fiber cleaving device is configured to cleave an optical fiber with a diameter in the range of 20 µm-4 mm, or 40 µm-2 mm.

Further advantages as well as advantageous features of the invention will appear from the following description of embodiments of the invention.

BRIEF DESCRIPTIONS OF THE DRAWINGS

With reference to the appended drawings, below follows a specific description of an embodiment of the invention cited as an example.

In the drawings.

DETAILED DESCRIPTION OF AN EMBODIMENT OF THE INVENTION

An optical fiber cleaving device according to an embodiment of the invention is illustrated in the appended FIGS. 1-10 and will now be described while at the same time making reference to all these Figures.

Figure 1:
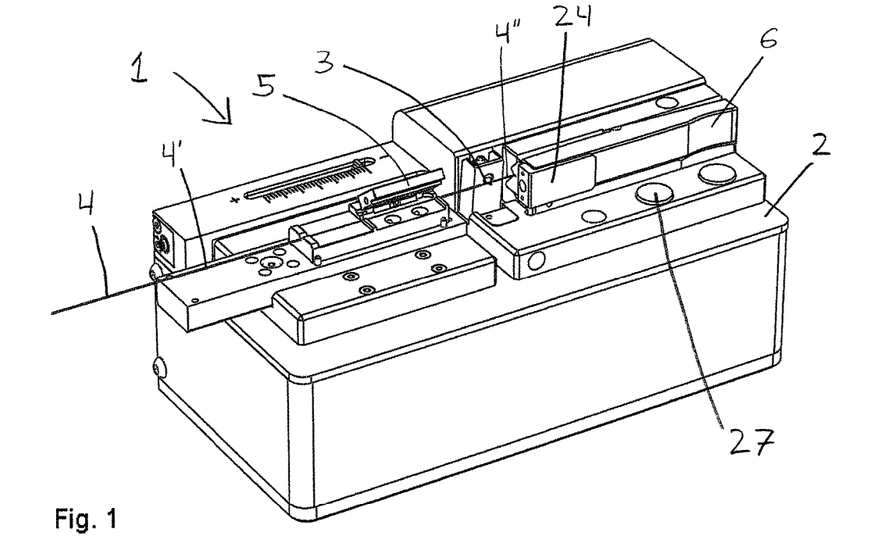
FIG. 1 is a perspective view from above of an optical fiber cleaving device according to an embodiment of the invention in a state of use.
Figure 2:
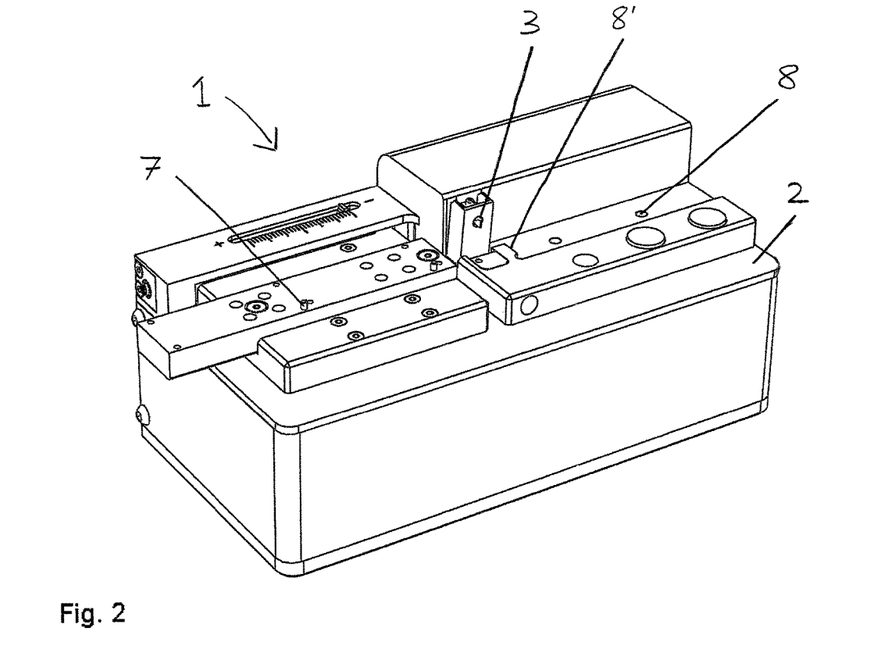
FIG. 2 is a view corresponding to FIG. 1 of the optical fiber cleaving device with the two fiber clamping arrangements thereof removed.

The optical fiber cleaving device 1 comprises a frame 2 provided with cleaving means 3 for cleaving an optical fiber 4 and first 5 and second 6 fiber clamping arrangements configured to hold a fiber to be cleaved on opposite sides of the fiber cleaving means during cleaving of the fiber. The frame is further provided with first securing means 7 configured to removably secure said first clamping arrangement to the frame 2, and second securing means 8, 8' configured to removably secure said second clamping arrangement to the frame.

The first securing means are pins 7 arranged on said frame 2 and the second securing means are magnets 8 and a support rim 8', but said first and second securing means may be any securing means suitable for securing the respective clamping arrangements to said frame, such as screws or grooves.

Figure 3:
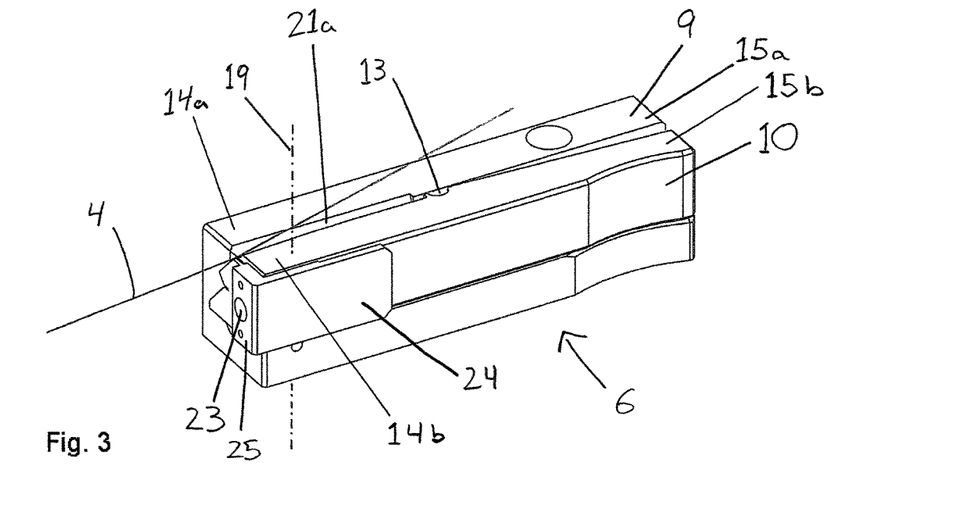
FIG. 3 is an enlarged perspective view from above of a second fiber clamping arrangement of the device shown in FIG. 1 in a closed clamping position.
Figure 4:
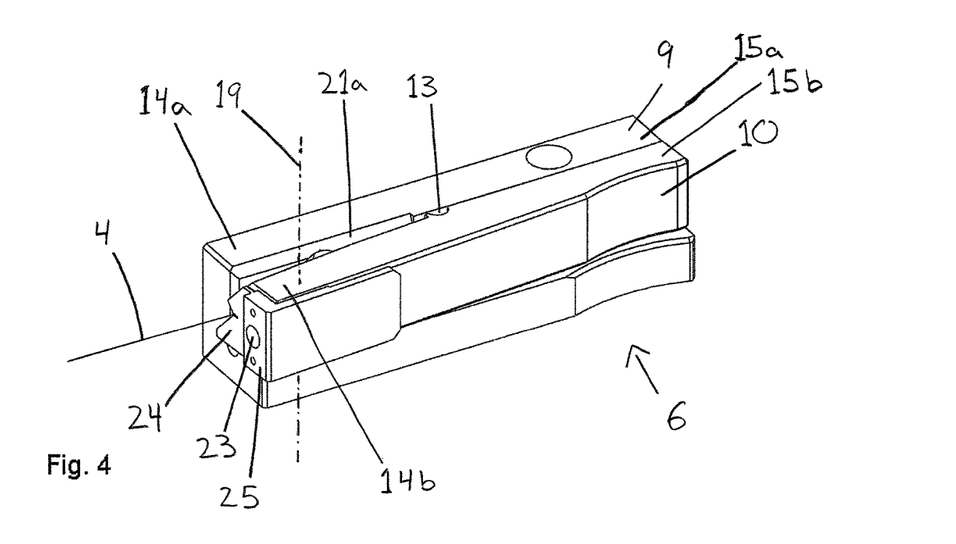
FIG. 4 is a view corresponding to FIG. 3 of the second fiber clamping arrangement in an open position receiving an optical fiber.
Figure 5:
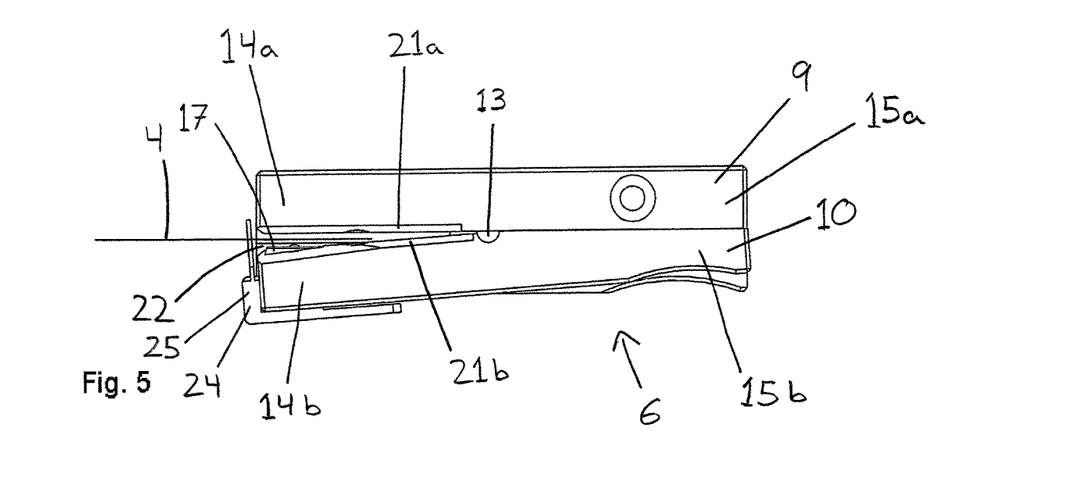
FIG. 5 is a view from above of the second fiber clamping arrangement in the position shown in FIG. 4.

The second clamping arrangement 6 has two members 9, 10 provided with plane surfaces 11, 12 facing each other. When the second clamping arrangement is secured to the frame 2 a first 9 of said members is fixedly arranged relative to the frame and a second 10 of said members is movably arranged relative to the frame and to said first member.

Figure 6:
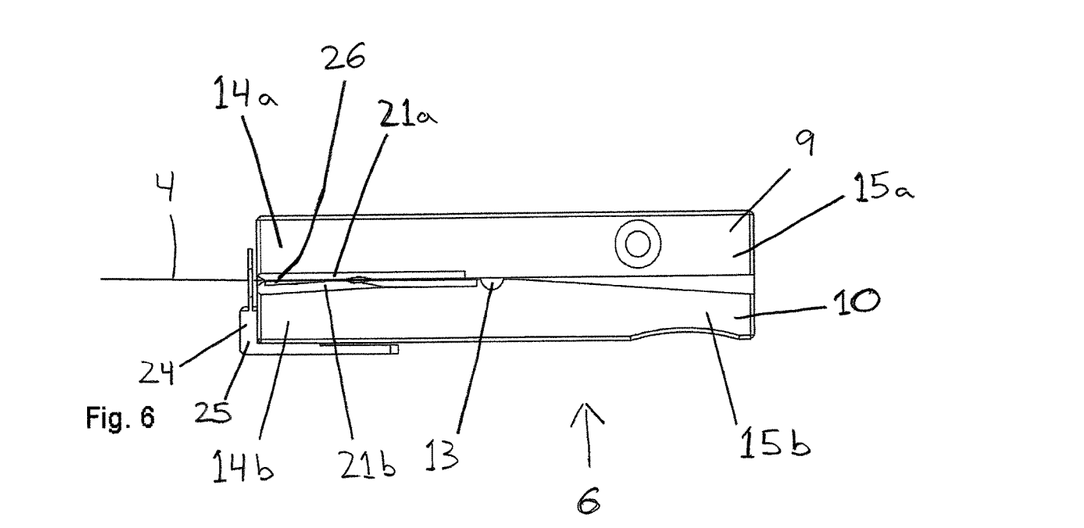
FIG. 6 is a view from above of the second fiber clamping arrangement in a closed clamping position securing an optical fiber.
Figure 7:
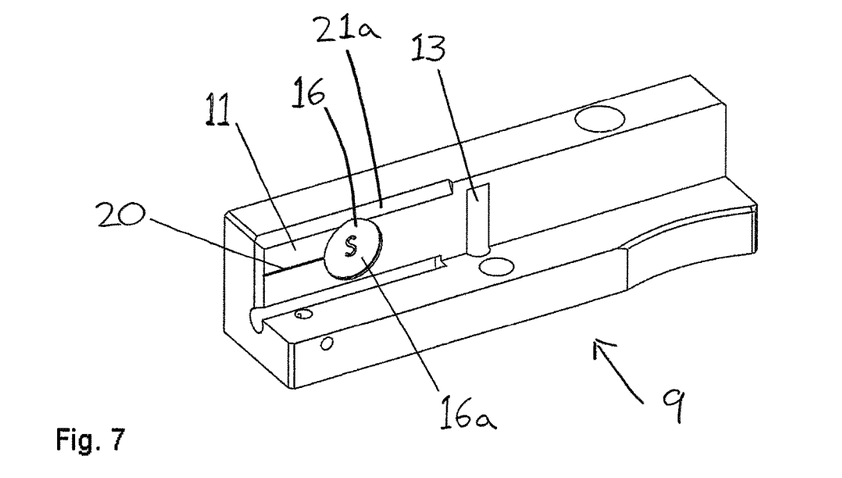
FIG. 7 is a perspective view according to FIG. 3 of a first member of the second fiber clamping arrangement to be fixedly secured with respect to a frame of the optical fiber cleaving device.

The two members are elongated members extending parallel or at least substantially parallel to each other in a closed clamping position of the second clamping arrangement 6 (see for instance FIG. 6). Said two members are interconnected through a hinge portion 13 in such a way that when two ends 14a, 14b of said two members 9, 10 facing each other are moved towards each other the opposite two ends 15a, 15b are separated, and reverse.

Each of the two members is provided with power means 16, 16' configured to urge said two ends 14a, 14b of said members towards each other and thereby said plane surfaces 11, 12 towards each other. Said power means are in this embodiment of the invention two magnets 16, 16' attracting each other but could also be for example mechanical power means, such as a spring. The second clamping arrangement is also provided with locking means 16a, 16b configured to maintain said members 9, 10 in a closed clamping position in which said plane surfaces contact each other. In this embodiment of the invention said locking means are said two magnets attracting each other, but could also be for example mechanical locking means such as a spring or a hasp.

Figure 8:
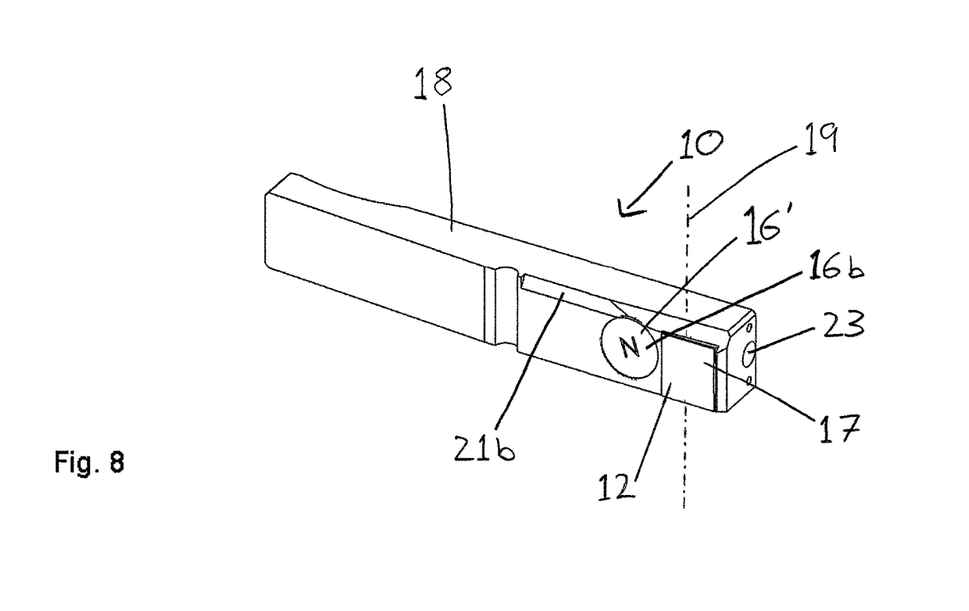
FIG. 8 is a perspective view from above of a second member of the second fiber clamping arrangement.
Figure 9:
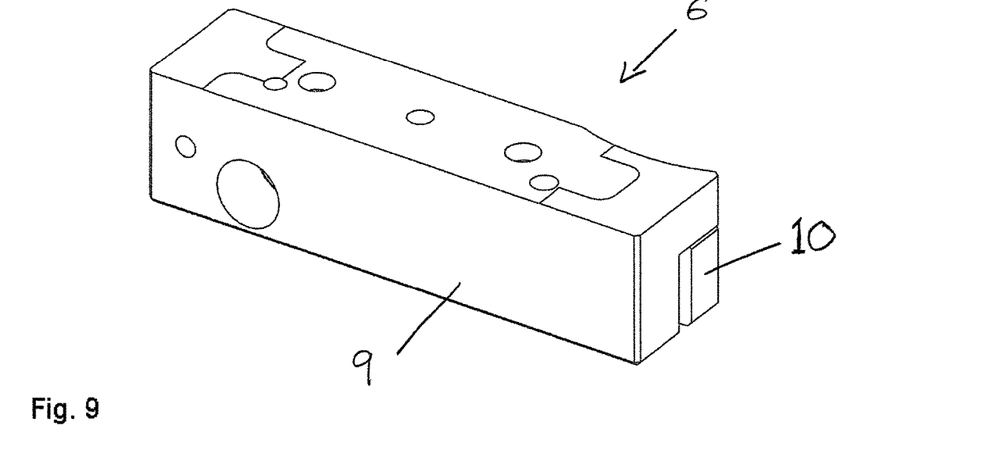
FIG. 9 is a perspective view from below of the second fiber clamping arrangement shown in FIG. 3.
Figure 10:
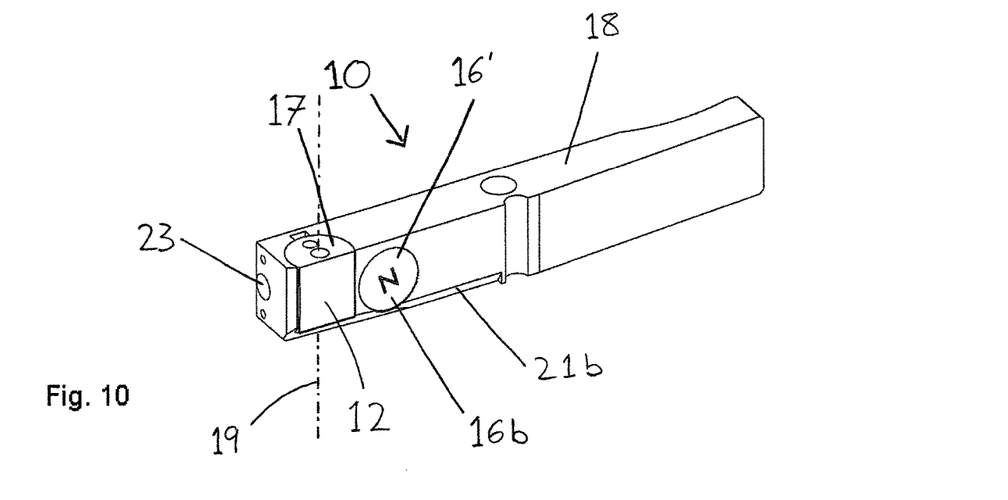
FIG. 10 is a perspective view from below of the second member shown in FIG. 8.

The second member 10 of the second clamping arrangement 6 has an element 17 provided with said plane surface 12 of that member. Said element is rotatably arranged with respect to a body 18 of said member about an axis 19 in parallel with said plane surface and perpendicular to a determined direction, said two members 9, 10 being configured to hold a fiber 4 extending in said determined direction in said closed position of said second clamping arrangement.

The first 11 of said two plane surfaces 11, 12 facing the second 12 on said element 17 is provided with a V-shaped groove 20 configured for receiving at least part of a fiber 4 to be cleaved in said closed clamping position.

The two members 9, 10 are each provided with a slope 21a, 21b configured in such a way that the two slopes together define an opening 22 tapering in the direction of insertion of a fiber in the second clamping arrangement 6.

The second member 10 is further provided with third securing means 23 configured to removably secure guiding means 24 to said body 18 of the second clamping arrangement, said guiding means 24 being configured to guide a fiber 4 to be cleaved towards a suitable securing position when the fiber is inserted in the second clamping arrangement. Said third securing means 23 comprises in the embodiment shown two magnets arranged at the body of said second member 10 and at a body 25 of said guiding means respectively. However, said third securing means may also be for example mechanical securing means such as screws or the like.

A method of cleaving and taking care of a fiber 4 with the optical fiber cleaving device 1 according to the invention is now to be described.

An operator of the optical fiber cleaving device releases the first clamping arrangement 5 from said device, places a fiber to be cleaved therein and clamps the fiber to said clamping arrangement. The fiber is stripped using a stripping-device and thereafter cleaned with alcohol.

The first clamping arrangement is then secured to the frame 2 of the cleaving device 1 by the first securing means 7. The fiber 4 clamped in the first clamping arrangement is received and will rest in a V-shaped slot 26 defined by the two slopes 21a, 21b of the two members 9, 10 in a closed clamping position of the second clamping arrangement 6 in such a way that the fiber is bended up over the second clamping arrangement (see FIG. 3).

As the operator presses the two ends 15a, 15b towards each other the two ends 14a, 14b and the two plane surfaces 11, 12 is separated from each other whereby an opening 22 tapering in the direction of insertion of the fiber 4 is provided and the two members 9, 10 are in a second open position. Internal forces in the fiber urges it to straighten out which makes the fiber snap down in said opening on the guiding means 24 and between the two members 9, 10 (see FIG. 4). The fiber is then resting on the guiding means and lying in the air between the two plane surfaces 11, 12.

Once the operator releases the two ends 15a, 15b the power means 16 urges the two members towards the closed clamping position. The guiding means guides the fiber 4 into the V-shaped groove 20 and the element 17 rotates about the axis 19 aligning its plane surface 12 to the extension of the fiber as the plane surfaces 11, 12 are pressed against each other and the fiber is secured in a suitable securing position therebetween (see FIG. 6).

Once the fiber is secured and held between the two clamping arrangements 5, 6 the operator presses a button 27 to release a spring which moves the first clamping arrangement 5 in the direction away from the second clamping arrangement 6 and the fiber 4 is stretched. The cleaving means 3 is then cleaving the fiber into two different parts, a first part 4' clamped in the first clamping arrangement and a second part 4" clamped in the second clamping arrangement.

The first clamping arrangement 5 is then released from the cleaving device 1 and secured to another machine for subsequently processing of the first fiber part. If the second fiber part is going to be subsequently processed or tested the second clamping arrangement 6 is released from the fiber cleaving device and secured to another machine, such as a fiber-welding machine. If the second fiber part is going to be thrown away as litter the second clamping arrangement is released from the fiber cleaving device and used as a tweezer.

For subsequently cleaving of a fiber 4 with a different diameter than that of the fiber cleaved the operator provides the cleaving device 1 with a second clamp arrangement 6 configured for clamping a fiber of said different diameter and/or provides the second clamping arrangement with guiding means 24 configured to guide a fiber with said diameter towards a suitable securing position when the fiber is inserted in the second clamping arrangement.

The invention is of course not in any way restricted to the embodiments thereof described above, but many possibilities to modifications thereof will be apparent to a person with ordinary skill in the art without departing from the scope of the invention as defined in the appended claims.

The meaning of the concept "cleaving" as in the sentence "cleaving a fiber" is in this writing "cutting through a fiber perpendicularly to its elongated extension.

An optical fiber is a thin rod made of a glass-, plastic- or similar material and functions as a waveguide to transmit light between the two ends of the rod.

The diameter of the fiber to be cleaved is not restricted to be in a specific range, but the optical fiber cleaving device could be used for cleaving all fiber diameter lengths used and also lenghts of fiber diameters not yet used, such as fibers with diameters less than 20 μm or more than 4 mm.

In the embodiment described one of said plane surfaces is provided with a V-shaped groove configured to receive at least part of a fiber in the closed clamping position. It is of course also possible that both said plane surfaces are provided with a groove.

The two plane surfaces are preferably flat or substantially flat surfaces, but may also be for example wave-shaped plane surfaces.

The concept "at least part of said members being movable with respect to each other" means that either both members are movable with respect to the other or that one member is movable with respect to the other, in other words that the distance from one member to the other can be increased and decreased. That at least part of said members are movable with respect to each other means that the whole members are movable with respect to each other, a part for example half of the members are movable with respect to each other or that one or both of said members comprise elements movable with respect to each other and to bodies of the respective members.

The power means and the locking means are in the embodiment of the invention described the same means which function as both power means and locking means. However, the power means and the locking means could of course also be two different means.

The member provided with said element could of course be either one of said two members. It is also possible that both members are provided with a said element.

The first and second fiber parts of the fiber cleaved can be short pieces or long cords, possibly secured to some type of device or provided with some type of means.

The first and/or second fiber clamping arrangements may of course be mounted to said frame of the cleaving device in a position in which they are rotated, for example 90°, around an axis extending in said determined direction so that the fiber to be cleaved may be inserted in said clamping arrangements in another direction as shown and assumed to be vertical, which then means in a horizontal direction in the case of a rotation by 90°.

The invention claimed is:

1. An optical fiber cleaving device (1) comprising
a frame (2) provided with cleaving means (3) for cleaving an optical fiber (4) therewith,
first (5) and second (6) fiber clamping arrangements configured to hold a fiber (4) to be cleaved on opposite sides of the fiber cleaving means (3) during cleaving of the fiber (4),
first securing means (7) configured to removably secure said first clamping arrangement (5), to the frame (2), and
second securing means (8, 8') configured to removably secure said second clamping arrangement (6) to the frame (2), wherein
the second clamping arrangement (6) is mounted on a surface of the frame (2) and comprises two separate clamping members (9, 10) configured to hold the fiber (4) in a clamping direction perpendicular to an axis of the fiber (4) and the surface of the frame (2) on which said second clamping arrangement (6) is mounted,
said two separate clamping members (9, 10) are provided with plane surfaces (11, 12) facing each other, at least part of said members (9, 10) being movable with respect to each other between at least a first closed clamping position enabling securing of a fiber (4) therebetween and a second open position allowing a fiber (4) to be inserted in or removed from the second clamping arrangement (6),
one (10) of said members (9, 10) has an element (17) provided with said plane surface (12) of that member (10) and movably arranged with respect to a body (18) of that member (10) to assume, in said closed clamping position, a position in which the plane surface (12) thereof extends in parallel with the plane surface (11) of the other said member (9), and
said element (17) is rotatably arranged with respect to a body (18) of that member (10) about an axis (19) in parallel with said plane surface (12) and perpendicular to the surface of the frame (2), said members (9, 10) being configured to hold a fiber (4) extending between said parallel plane surfaces (11, 12) in said closed position of said second clamping arrangement (6).

2. An optical fiber cleaving device (1) according to claim 1, wherein when the second clamping arrangement (6) is secured to the frame (2), at least part of a first (9) of said two members (9, 10) is fixedly arranged relative to the frame (2) and at least part of a second (10) of said two members (9, 10) is movably arranged relative to the frame (2) and to said first member (9).

3. An optical fiber cleaving device (1) according to claim 1, wherein said second clamping arrangement (6) is provided with power means (16, 16') configured to urge at least said parts of said members (9, 10) towards said closed clamping position.

4. An optical fiber cleaving device (1) according to claim 1, wherein said second clamping arrangement (6) is provided with locking means (16a, 16b) configured to maintain at least said parts of said members (9, 10) in said closed clamping position.

5. An optical fiber cleaving device (1) according to claim 1, wherein one (11) of said plane surfaces (11, 12) is provided with a groove (20) configured for receiving at least part of the fiber (4) to be cleaved in said closed clamping position.

6. An optical fiber cleaving device (1) according to claim 5, wherein said plane surface (11) provided with said groove (20) is a plane surface (11) facing said plane surface (12) on said element (17).

7. An optical fiber cleaving device (1) according to claim 5, wherein said groove (20) is tapering in the direction away from said plane surface (11) provided with the groove (20), said groove (20) being preferably U-shaped or V-shaped.

8. An optical fiber cleaving device (1) according to claim 1, wherein each of said two members (9, 10) is provided with a slope (21a, 21b) slanting away from one another from the respective plane surfaces (11, 12) towards an edge of skid respective member (9, 10), and configured such that the two slopes (21a, 21b) together define an opening (22) tapering in the direction of insertion of a fiber (4) in the second clamping arrangement (6).

9. An optical fiber cleaving device (1) comprising
a frame (2) provided with cleaving means (3) for cleaving an optical fiber (4) therewith,
first (5) and second (6) fiber clamping arrangements configured, to hold a fiber (4) to be cleaved on opposite sides of the fiber cleaving means (3) during cleaving of the fiber (4),
first securing means (7) configured to removably secure said first clamping arrangement (5) to the frame (2), and
second securing means (8, 8') configured to removably secure said second clamping arrangement (6) to the frame (2) wherein
said second clamping arrangement (6) has two members (9, 10) provided with plane surfaces (11, 12) facing each otter, at least part of said members (9, 10) being movable with respect to each other between at least a first closed clamping position enabling securing of a fiber (4) therebetween and a second open position allowing a fiber (4) to be inserted in or removed from the second clamping arrangement (6),
said two members (9, 10) are elongated members (9, 10) extending parallel or at least substantially parallel to each other in said closed clamping position, and
said two members (9, 10) are interconnected through a hinge portion (13) located between end portions (14a, 14b, 15a, 15b) thereof such that when two said ends (14a, 14b) of said two members (9, 10) facing each other are moved towards each other, said two opposite ends (15a, 15b) are separated, and reverse.

10. An optical fiber cleaving device (1) according to claim 9, wherein one (10) of said members (9, 10) has an element (17) provided with said plane surface (12) of that member (10) and movably arranged with respect to a body (18) of that member (10) to assume, in said closed clamping position, a position in which the plane surface (12) thereof extends in parallel with the plane surface (11) of the other said member (9).

11. An optical fiber cleaving device (1) comprising
frame (2) provided with cleaving means (3) for cleaving an optical fiber (4) therewith,
first (5) and second (6) fiber clary ping arrangements configured to hold a fiber (4) to be cleaved on opposite sides of the fiber cleaving means (3) during cleaving of the fiber (4),
first securing means (7) configured to removably secure said first clamping arrangement (5) to the frame (2), and
second securing means (8, 8') configured to removably secure said second clamping arrangement (6) to the frame (2), wherein
the second clamping arrangement (6) is mounted on a surface of the frame (2) and comprises two separate clamping members (9,10) configured to hold the fiber (4) in a clamping direction perpendicular to an is of the fiber (4) and the surface of the frame (2) on which said second clamping arrangement (6) is mounted,
said second clamping arrangement (6) is provided with guiding means (24) configured to guide the fiber (4) to be cleaved towards a suitable securing position w hen the fiber (4) is inserted in the second clamping arrangement (4), and
said second clamping arrangement (6) is provided with third securing means (23) mounted only upon a body (18) of said second clamping arrangement (6) and configured to removably secure said guiding means (24) to said body (18) of said second clamping arrangement (6).

12. An optical fiber cleaving device (1) according to claim 11, wherein said two separate clamping members (9, 10) are provided with plane surfaces (11, 12) facing each other, at least part of said members (9, 10) being movable with respect to each other between at least a first closed clamping position enabling securing of the fiber (4) therebetween and a second open position allowing the fiber (4) to be inserted in or removed from the second clamping arrangement (6).

13. An optical fiber cleaving device (1) according to claim 11, wherein said second member (10) is provided with said guiding means (24).

* * * * *